UNITED STATES PATENT OFFICE.

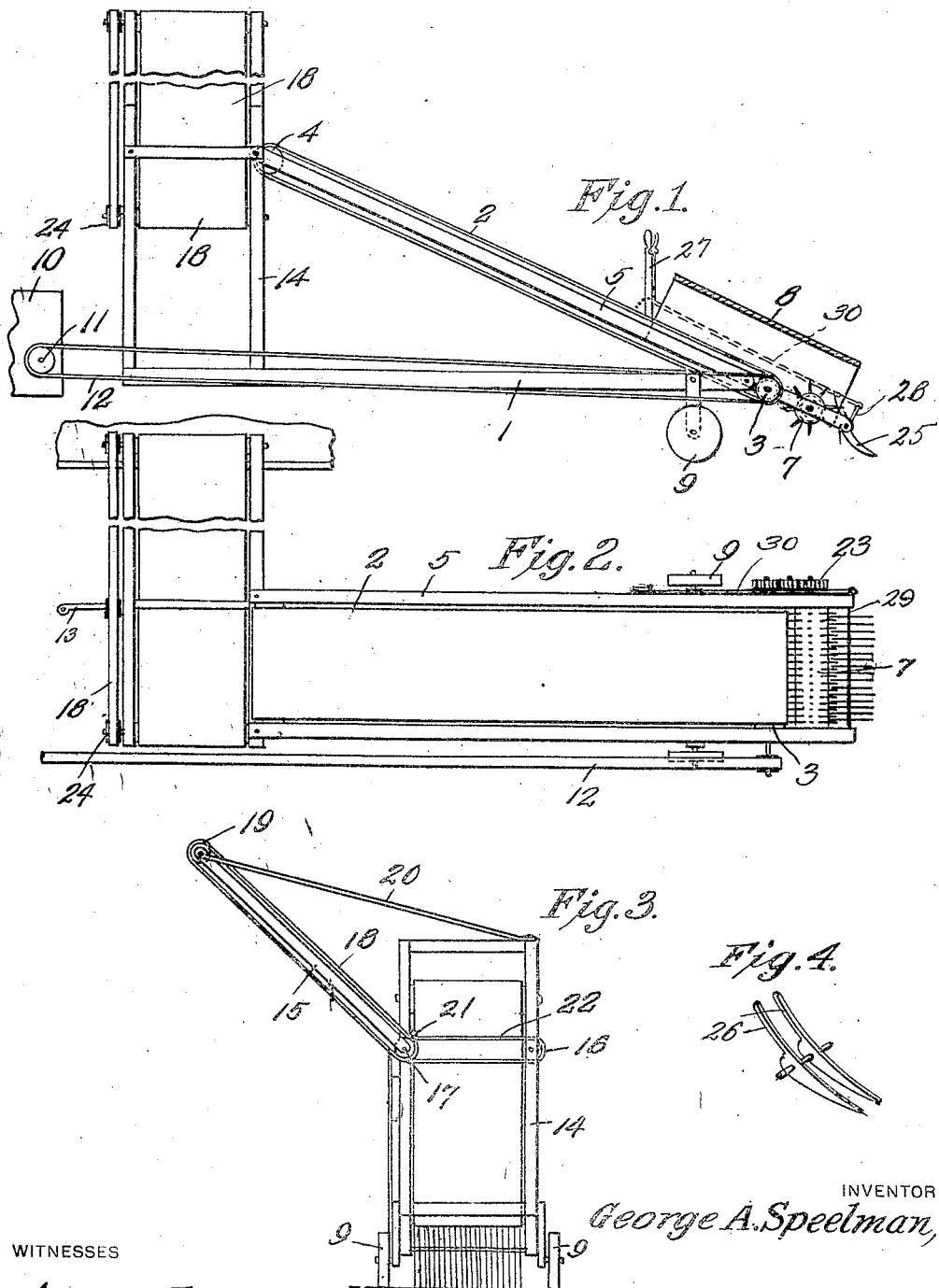

GEORGE ALVA SPEELMAN, OF WAYNE, NEBRASKA.

MANURE-LOADER.

1,293,229.  Specification of Letters Patent.  Patented Feb. 4, 1919.

Application filed April 1, 1918. Serial No. 226,034.

*To all whom it may concern:*

Be it known that I, GEORGE ALVA SPEELMAN, a citizen of the United States, residing at Wayne, in the county of Wayne and State of Nebraska, have invented certain new and useful Improvements in Manure-Loaders, of which the following is a specification.

This invention relates to a manure loading device and has for its object the production of a simple and efficient mechanism whereby the forward end of the manure loading device may be forced or shoved under a pile of manure for the purpose of elevating the same to a wagon or other suitable manure spreader.

Another object of this invention is the production of a simple and efficient manure elevating device which may be supported upon the front of a motor tractor for the purpose of facilitating the movement of the same from place to place and for throwing the elevating mechanism into engagement with a pile of manure for the purpose of loading the same upon the manure spreader.

With these and other objects in view, this invention consists of certain novel combinations, constructions, and arrangement of parts as will be hereinafter fully described and claimed.

One practical form of construction and assembly of the present invention will be hereinafter described and is illustrated in the accompanying drawings, in which—

Figure 1 is a side elevation of the manure elevating device, the shield or hood carried by the forward end thereof being shown in section.

Fig. 2 is a top plan view of the structure shown in Fig. 1.

Fig. 3 is a rear elevation of the structure shown in Figs. 1 and 2 of the drawing.

Fig. 4 is a detail perspective view of one of the tines of the fork or rake carried by the forward end of the frame.

By referring to the drawings it will be seen that 1 designates the main frame of the elevating mechanism upon which main frame is supported a forward inclined conveyer belt 2, the conveyer belt 2 passing over the lower roller 3 and the upper roller 4. The conveyer belt 2 may be made of any suitable or desired construction for the purpose of facilitating the elevating of the manure to the desired height and the conveyer belt 2 is supported upon an inclined frame 5, the frame 5 being provided with forwardly projecting ends 6 between which ends 6 is mounted a picking roller or distributing roller 7, for the purpose of elevating the manure and delivering the same to the conveyer belt 2.

A shield hood 8 is carried by the frame 1 and overhangs the inclined frame 5 as shown in Fig. 1 and this shield hood 8 is spaced from the upper face of the conveyer belt 2 and is adapted to prevent the manure from being thrown upwardly and off from the lower end of the conveyer belt 2 as the same is picked up by the roller 7. The forward end of the frame 1 is supported in any suitable manner by means of a supporting roller 9 carried by the forward end of the frame 1.

It should be understood that the frame 1 may be attached to or supported in any desired manner upon the front of a motor tractor 10 which motor tractor 10 carries a driving pulley 11 over which a belt 12 passes, the belt 12 also passing over a suitable pulley carried by the roller 3 for the purpose of driving the same. The frame 1 is provided with rearwardly extending end portion 13 which end portion is secured to the tractor frame 10 as shown in Fig. 1.

The frame 1 carries a vertically extending frame work 14 which vertically extending frame work 14 also supports a laterally extending inclined conveyer frame 15. A roller 16 is carried by the frame 14 and a lower roller 17 is also carried by the frame 14 for the purpose of driving the conveyer belt 18. This conveyer belt 18 passes over the roller 17 and also over the roller 16 and it also passes over an upper roller 19 carried by the inclined frame 15. This inclined frame 15 is braced by means of the angularly extending braces 20 carried by the frame 14 and the inner end of the braces 20 are secured at their inner ends to the upper end of the frame 14 as shown in Fig. 3 of the drawings. A suitable guiding roller 21 is carried by the frame 14 directly above the roller 17 and is adapted to firmly hold the conveyer belt 18 downwardly in engagement with the roller belt 17 and facilitate the moving of the manure from the horizontally extending portion 22 of the belt 18 upon the inclined portion of the belt 18. This structure will be clearly understood by considering the Fig. 3 of the drawing.

From the foregoing description it will be seen that the motor tractor 10 may shove the forward end of the frame 1 under a pile of manure and the picking wheel 7 which is driven by means of the train of gears 23 will be rotated for the purpose of picking up the manure and throwing the same upon the inclined belt 2, these gears 23 being actuated by the roller 3. The manure will then drop upon the horizontally extending portion 22 of the belt 18 and then be elevated up the inclined portion of the belt 18, and dropped into a manure distributer or other vehicle which is adapted to perform the same functions.

From the foregoing description it will be seen that a very simple and efficient mechanism has been produced for the purpose of loading manure from a pile onto a manure spreader without the necessity of handling the same, thereby greatly cheapening the loading of the manure spreader and saving considerable time in connection therewith.

As shown in Fig. 1 the transversely extending conveyer 18 is operated by means of a suitable driving belt 18' which passes over suitable driving pulleys 24 shown in Figs. 1 and 2 of the drawings.

It of course should be understood that certain obvious detail mechanical changes may be made in the present device without departing from the spirit of the invention so long as these changes fall within the scope of the appended claims.

By referring to Figs. 1 and 2 it will be seen that the frame 5 carries a fork upon the forward end thereof, which fork comprises a plurality of fingers or tines 25, which fingers or tines 25 terminate in upwardly inclined portions 26 which portions 26 project above or over the picker or roller 7 as shown in Fig. 1. The spurs of the picker or roller 7 extend between the projecting portions 26 of the tines or fingers 25 and remove the manure from the fork. In this way the manure will be easily and efficiently raised from the ground and deposited upon the conveyer belt 2.

A suitable operating lever 27 is mounted in any desired position upon the frame 5 and is connected to an upwardly extending arm 28 carried by the fork supporting shaft 29 by means of a connecting link 30, thereby permitting the angular fork 25 to be adjusted to suit the circumstances under which the device is operating.

What is claimed is:

1. A manure loader of the class described comprising a frame, a conveyer belt supported thereby, a distributing roller mounted upon said frame in advance of the forward end of said conveyer belt, a fork mounted upon said frame in advance of said distributing roller and provided with a plurality of rearwardly projecting tines, said distributing roller provided with a plurality of spurs working between the tines of said fork, and means engaging said fork for facilitating the adjustment thereof upon said frame.

2. A manure loader of the class described comprising a conveyer belt, a distributing roller carried upon the forward end of said frame in advance of said conveyer belt, a fork pivotally mounted in advance of said conveyer belt and roller, said fork provided with a plurality of rearwardly projecting tines adapted to overhang said distributing roller, said distributing roller provided with a plurality of spurs working between said tines, an operating lever mounted adjacent said conveyer belt and coöperating with said fork for raising and lowering said fork, supporting means for said belt, and a hood extending over the lower end of said belt and said distributing roller.

3. A manure loader of the class described comprising a frame, a forward inclined conveyer belt, a transversely extending conveyer belt working at right angles to said first mentioned conveyer belt, a fork mounted upon the forward end of said frame and provided with a plurality of tines, a distributing roller mounted in the rear of said fork and in advance of said inclined conveyer belt, said distributing roller provided with a plurality of spurs adapted to work between the tines of said fork for the purpose of removing material from said fork, means for adjusting said fork, and a shield hood mounted over said distributing roller and the lower end of said conveyer belt for facilitating the delivery of material upon said conveyer belt from said roller.

In testimony whereof I affix my signature in presence of two witnesses.

GEORGE ALVA SPEELMAN.

Witnesses:
H. W. ASCH,
O. A. TIEDSKE.